United States Patent
Inoue et al.

(10) Patent No.: US 11,207,873 B2
(45) Date of Patent: Dec. 28, 2021

(54) LAMINATE HAVING LAYER CONTAINING SAPONIFIED ETHYLENE/VINYL ESTER COPOLYMER, SECONDARY MOLDED ARTICLE THEREOF, AND METHOD FOR MANUFACTURING BOTTOMED CONTAINER

(71) Applicant: MITSUBISHI CHEMICAL CORPORATION, Tokyo (JP)

(72) Inventors: Kota Inoue, Osaka (JP); Ryohei Komuro, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 206 days.

(21) Appl. No.: 15/527,101

(22) PCT Filed: Nov. 18, 2015

(86) PCT No.: PCT/JP2015/082390
§ 371 (c)(1),
(2) Date: May 16, 2017

(87) PCT Pub. No.: WO2016/080438
PCT Pub. Date: May 26, 2016

(65) Prior Publication Data
US 2018/0170025 A1 Jun. 21, 2018

(30) Foreign Application Priority Data
Nov. 18, 2014 (JP) .............................. JP2014-233819

(51) Int. Cl.
| | | |
|---|---|---|
| *B32B 27/32* | (2006.01) | |
| *B29C 51/14* | (2006.01) | |
| *B32B 27/28* | (2006.01) | |
| *B65D 1/28* | (2006.01) | |
| *B29C 51/08* | (2006.01) | |
| *B29C 51/10* | (2006.01) | |
| *B32B 27/08* | (2006.01) | |
| *B65D 65/40* | (2006.01) | |
| *B29K 23/00* | (2006.01) | |
| *B29L 31/00* | (2006.01) | |

(52) U.S. Cl.
CPC ............ *B32B 27/32* (2013.01); *B29C 51/082* (2013.01); *B29C 51/10* (2013.01); *B29C 51/14* (2013.01); *B32B 27/08* (2013.01); *B32B 27/28* (2013.01); *B65D 1/28* (2013.01); *B65D 65/40* (2013.01); *B29K 2023/08* (2013.01); *B29K 2023/12* (2013.01); *B29K 2995/0067* (2013.01); *B29L 2031/712* (2013.01); *B32B 2307/7242* (2013.01); *B32B 2439/02* (2013.01)

(58) Field of Classification Search
CPC ......... B32B 27/32; B32B 27/08; B32B 27/28; B32B 2307/7242; B32B 2439/02; B29C 51/082; B29C 51/10; B29C 51/14; B65D 65/40; B65D 1/28; B29K 2995/0067; B29K 2023/08; B29K 2023/12; B29L 2031/712

See application file for complete search history.

(56) References Cited

U.S. PATENT DOCUMENTS

| | | | |
|---|---|---|---|
| 6,383,583 | B1 | 5/2002 | Ninomiya et al. |
| 6,503,588 | B1 | 1/2003 | Hayashi et al. |
| 2012/0241352 | A1 | 9/2012 | Pramanik et al. |
| 2016/0177080 | A1 | 6/2016 | Inoue et al. |

FOREIGN PATENT DOCUMENTS

| | | |
|---|---|---|
| CN | 1280912 A | 1/2001 |
| CN | 105555860 A | 5/2016 |
| EP | 2194093 A1 | 9/2010 |
| JP | S62-113526 A | 5/1987 |
| JP | S63-230757 A | 9/1988 |
| JP | H08-239528 A | 9/1996 |
| JP | H08-311276 A | 11/1996 |
| JP | 2000-167998 A | 6/2000 |
| JP | 5466982 B2 | 4/2014 |
| JP | 2015-083665 | 4/2015 |
| WO | 2010/030892 A1 | 3/2010 |
| WO | 2015/041135 A1 | 3/2015 |

OTHER PUBLICATIONS

Machine Translation of JP 2000-167998 A (Year: 2000).*
Official Communication issued in European Patent Office (EPO) Patent Application No. 15861495.8, dated May 18, 2018.
Japanese Office Action, Japanese Patent Office, Application No. 2015-557279, dated Jun. 18, 2019, with English Machine Translation.
International Search Report issued with respect to Application No. PCT/JP2015/082390, dated Feb. 23, 2016.
International Preliminary Report on Patentability issued with respect to Application No. PCT/JP2015/082390, dated May 23, 2017.
Extended European Search Report issued in the corresponding European patent application No. 15861495.8, dated Sep. 19, 2018.
CN Office Action issued in CN App. No. 201580062198.9 dated Oct. 15, 2019 with English translation.
"New Technology of Extrusion Molding," Mechanical Industry Press, ISBN 978-7-111-31620-6, Jan. 2011, pp. 28-30 with English translation.

(Continued)

*Primary Examiner* — Leith S Shafi
(74) *Attorney, Agent, or Firm* — Greenblum & Bernstein, P.L.C.

(57) ABSTRACT

The laminate of the present invention a laminate comprising a layer comprising a saponified ethylene/vinyl ester copolymer and a layer which comprises a thermoplastic resin that is not an EVOH resin and which has been laminated to at least one surface of the layer comprising a saponified ethylene/vinyl ester copolymer via a layer comprising an adhesive resin, wherein shear viscosity ratio of the saponified ethylene/vinyl ester copolymer and the adhesive resin (saponified ethylene/vinyl ester copolymer to adhesive resin) is 0.70-1.50 at a shear rate of 0.1 [1/s] and 0.90-1.10 at a shear rate of 1.0 [1/s].

5 Claims, No Drawings

(56) References Cited

OTHER PUBLICATIONS

CN Decision of Rejection issued in CN Patent Application No. 201580062198.9, dated May 13, 2020, English translation.
Japanese Office Action issued in Japanese Patent Application No. 2015-557279 dated Jan. 28, 2020, English translation.

* cited by examiner

LAMINATE HAVING LAYER CONTAINING SAPONIFIED ETHYLENE/VINYL ESTER COPOLYMER, SECONDARY MOLDED ARTICLE THEREOF, AND METHOD FOR MANUFACTURING BOTTOMED CONTAINER

TECHNICAL FIELD

The present invention relates to a laminate comprising a layer comprising a saponified ethylene/vinyl ester copolymer (hereinafter often referred to as "EVOH resin") and a layer which comprises a thermoplastic resin that is not a saponified ethylene/vinyl ester copolymer and which has been laminated to at least one surface of the layer comprising a saponified ethylene/vinyl ester copolymer via a layer comprising an adhesive resin. More particularly, the invention relates to such laminate which, even when subjected to secondary molding into the shape of a bottomed container, is capable of providing secondary molded articles of forming that have an excellent appearance in which streaks or the like is not observed.

BACKGROUND ART

EVOH resins are excellent in terms of transparency, gas barrier property, fragrance retentivity, solvent resistance, oil resistance, etc., and are hence utilized as food packaging materials, medicine packaging materials, industrial-chemical packaging materials, agricultural-chemical packaging materials, and the like, in the form of films, sheets or after having been shaped into bottomed containers such as bottles and cups. Sheets, films, and containers as packaging materials can be produced from an EVOH resin alone. Usually, however, sheets, films, and containers as packaging materials are produced from a laminate comprising a layer including a thermoplastic resin (other thermoplastic resin) that is not an EVOH resin (the layer is hereinafter referred to also as "another thermoplastic resin layer"), via a layer including an adhesive resin (hereinafter referred to also as "adhesive resin layer"), for the purposes of enhancing the water resistance and strength, imparting other functions, etc.

Since EVOH resins are less stretchable resins as compared with other thermoplastic resins, there was a problem in that appearance failures occur when the molding or forming into films, sheets, containers, or the like involves stretching with heating. It is hence necessary to improve the stretchability of EVOH resins so that the EVOH resins can follow up the stretching of other thermoplastic resins.

In general, there is a tendency for EVOH resins that the higher the content of structural ethylene units (hereinafter referred to simply as "ethylene content"), the higher the stretchability. Meanwhile, the gas barrier properties decrease as the ethylene content increases. It has been proposed to use an EVOH resin having a low ethylene content in combination with an EVOH resin having a high ethylene content, in order to attain both gas barrier properties and stretchability.

For example, JP-A-S63-230757 (patent document 1) proposes a composition which includes, in combination, EVOH resins differing in ethylene content and the degree of saponification. Patent document 1 states that in cases when a laminate was produced by laminating a composition including two EVOH resins in combination, the EVOH resins having a difference in ethylene content of 4% by mole or larger, a difference in saponification degree of 3% by mole or larger, and a difference in solubility parameter not less than a given value, as an interlayer to polystyrene layers and this laminate was shaped by vacuum/air-pressure forming, this molded article was excellent in terms of transparency and appearance, had no cracks and no wall thickness unevenness, and had excellent gas barrier properties.

JP-A-H8-311276 (patent document 2) discloses an EVOH resin composition which includes two EVOH resins having a difference in ethylene content of 3-20% by mole and which has a specific boron concentration. Patent document 2 states that a laminated film obtained by using the EVOH resin composition as an interlayer and laminating polypropylene layers thereto, via an adhesive resin layer, was free from stretching unevenness, such as blushing or streaks, even when stretched with heating (four times in the machine direction and then six times in the transverse direction).

PRIOR-ART DOCUMENTS

Patent Documents

Patent Document 1: JP-A-S63-230757
Patent Document 2: JP-A-H8-311276

SUMMARY OF THE INVENTION

Problem that the Invention is to Solve

The EVOH resin compositions disclosed in patent documents 1 and 2 are intended to improve the formability of the EVOH resins while ensuring gas barrier properties. Incidentally, forming into a bottomed container is generally conducted by heating and softening a sheet or film of a laminate and appressing the sheet or film to a forming die by vacuum suction or compressed-air blowing. Such vacuum-pressure forming is thought to be a more severe processing as compared with the uniaxial or biaxial stretching of laminated films or sheets. It was found that in cases when the laminated film disclosed in patent document 2 is used to form a cup by vacuum/air-pressure forming, streaks generate, although such streaks are not observed in stretched films or sheets.

In patent document 1, vacuum/air-pressure forming (draw ratio, 1 (stretch ratio, 7)) and stretch blow forming (stretch ratio, 10) are conducted to form a bottomed container. However, with respect to the appearance evaluation of the molded article obtained, the article was visually evaluated merely for transparency, cracks, and wall thickness unevenness and the article was not evaluated as to whether streaks had generated or not.

An object of the present invention is to provide a laminate comprising a layer comprising an EVOH resin and a layer which comprises a thermoplastic resin that is not a EVOH resin and which has been laminated to at least one surface of the layer comprising an EVOH resin via a layer comprising an adhesive resin, preferably, a laminate which has an excellent appearance and comprises a layer comprising two or more EVOH resin differing in ethylene content and a layer which comprises a thermoplastic resin that is not a EVOH resin and which has been laminated to at least one surface of the layer comprising two or more EVOH resin differing in ethylene content via a layer comprising an adhesive resin. Another object is to provide the laminate which includes a layer including one or more EVOH resins and which retains gas barrier properties and is inhibited from developing streaks when vacuum/air-pressure forming is applied thereto. Still another object of the invention is to provide a process for producing a bottomed container, e.g., a cup, that is excellent in terms of gas barrier property and appearance, using the laminate by vacuum/air-pressure forming or the like.

Means for Solving the Problem

The present inventors made various investigations on the appearance failures which occurred when laminates each including an EVOH-resin-containing layer and, laminated thereto, an adhesive resin layer and a layer of another thermoplastic resin were subjected to vacuum/air-pressure forming. In particular, the inventors made various investigations on the streaks which occurred in the vacuum/air-pressure forming of a laminate in which two or more EVOH resins differing in ethylene content were used as the EVOH resins.

In the case where different resins are molded by coextrusion molding, the resin flows are prone to be disturbed at the converging part (boundary) within the feed block because the molten-state resins of the respective resin layers differ in flowability. In a layer including two or more EVOH resins differing in ethylene content, the resins, which differ in melt viscosity, are in the state of having intermingled with each other. Consequently, in cases when a layer of a composition including EVOH resins considerably differing in ethylene content is used as an interlayer for a laminate to conduct coextrusion molding of an adhesive resin layer and a layer of another thermoplastic resin, then the converging part (boundary) where the EVOH resin composition layer meets an adjoining layer is thought to be in such a state that a disturbance of resin has occurred at the boundary between the different resin layers and the confluence of the different EVOH resins with the resin (adhesive resin) of the adjoining layer is in an intermingled state and that disturbances finer than disturbances occurring at ordinary boundaries have occurred. Meanwhile, in the forming of a bottomed container by vacuum/air-pressure forming, the tension applied during stretching varies from portion to portion unlike the tension in film stretching, in which the whole film is evenly stretched. It is thought that in cases when the laminate containing fine boundary disturbances was subjected to such vacuum/air-pressure forming, the parts including the fine boundary disturbances were elongated to become visible streaks.

The present inventors then made detailed investigations on a relationship between the flowability of molten-state resins and the generation of streaks, in processes for producing a laminate comprising a layer comprising an EVOH resin, in particular, a layer comprising two or more EVOH resin differing in ethylene content, and a layer which comprises a thermoplastic resin that is not a EVOH resin and which has been laminated to at least one surface of the layer comprising an EVOH resin via a layer comprising an adhesive resin. As a result, the present invention has been achieved.

It was discovered that in the case where a layer including an EVOH resin is used as an interlayer for a laminate to conduct coextrusion molding of an adhesive resin layer and a layer of another thermoplastic resin, the shear rate at the EVOH resin/adhesive resin boundary in the feed block is generally about 0.01-10 [1/s]. Namely, for inhibiting boundary disorders from occurring at the EVOH/adhesive resin boundary, it is necessary to control the resin flowability within that shear rate range.

The laminate of the present invention is a laminate comprising a layer comprising an EVOH resin and a layer which comprises a thermoplastic resin that is not an EVOH resin and which has been laminated to at least one surface of the layer comprising an EVOH resin via a layer comprising an adhesive resin, wherein shear viscosity ratio of the saponified ethylene/vinyl ester copolymer and the adhesive resin (saponified ethylene/vinyl ester copolymer to adhesive resin) is 0.70-1.50 at a shear rate of 0.1 [1/s] and 0.90-1.10 at a shear rate of 1.0 [1/s].

It was discovered that in the case where two or more EVOH resins differing in ethylene content are used as that EVOH resin, two EVOH resins considerably differing in ethylene content do not come into a compatibly mixed state upon melting and do form a sea-island structure and this EVOH resin composition has an increased shear viscosity in a low-shear-rate region (e.g., 1.0 [1/s]) because of the sea-island structure. Consequently, the present invention, in particular, relates to the laminate in which the EVOH resin used is a mixture of two or more EVOH resins differing in ethylene content.

In the present invention, it is preferable that the difference in the ethylene content of the structural ethylene units ($\Delta$Et) between the saponified ethylene/vinyl ester copolymer which is the highest in the content and the saponified ethylene/vinyl ester copolymer which is the lowest in the content, of the two or more saponified ethylene/vinyl ester copolymers, should be 10-25% by mole.

It is preferable in the invention that the layer including a saponified ethylene/vinyl ester copolymer should contain a zinc salt of a higher fatty acid in an amount of 350-800 ppm in terms of the saponified ethylene/vinyl ester copolymer contained.

It is preferable that the thermoplastic resin should be polypropylene.

Provided in another aspect of the present invention is a secondary molded article using the laminate of the invention, the secondary molded article being excellent in terms of gas barrier property and appearance.

Provided in still another aspect of the invention is a process for obtaining a bottomed container excellent in terms of gas barrier property and appearance from the laminate of the invention. Specifically, the process for obtaining a bottomed container excellent in terms of gas barrier property and appearance includes: a step of heating and softening a sheet or film of the laminate of the present invention; a step of appressing the sheet or film to a forming die by vacuum suction and/or compressed air, and a step obtaining a bottomed container by cooling and demolding.

Effect of the Invention

The laminate of the present invention comprising a layer comprising an EVOH resin and a layer which comprises a thermoplastic resin that is not a EVOH resin and which has been laminated to at least one surface of the layer comprising an EVOH resin via a layer comprising an adhesive resin has an advantage in that even when this laminate is subjected to vacuum/air-pressure forming, bottomed containers having an excellent appearance with no streaks or the like can be obtained.

MODES FOR CARRYING OUT THE INVENTION

The configurations of the invention are explained below in detail. However, the following explanations are merely on desirable embodiments, and the invention should not be construed as being limited to the following explanations.

The laminate of the invention is a laminate comprising a layer comprising an EVOH resin and a layer which comprises a thermoplastic resin that is not a EVOH resin (layer of another thermoplastic resin) and which has been laminated to at least one surface of the layer comprising an EVOH resin via a layer comprising an adhesive resin (adhesive resin layer).

<EVOH Resins>

EVOH resins usable in the invention usually are resins each obtained by saponifying a copolymer of ethylene with a vinyl ester monomer (ethylene/vinyl ester copolymer), and are water-insoluble thermoplastic resin. Polymerization can be conducted by any of known polymerization methods such as, for example, solution polymerization, suspension polymerization, and emulsion polymerization. In general, however, use is made of solution polymerization in which methanol is used as the solvent. The saponification of the ethylene/vinyl ester copolymer obtained can be conducted also by a known method, for example, a method in which an alkali catalyst is added to the ethylene/vinyl ester copolymer solution from which the unreacted vinyl ester monomer has been removed.

The thus-produced EVOH resin mainly includes structural units derived from ethylene (structural ethylene units) and structural vinyl alcohol units, and further contains a slight amount of structural vinyl ester units remaining unsaponified.

Vinyl acetate is representatively used as the vinyl ester monomer from the standpoints of availability on the market and the high efficiency of impurity treatment during production. Examples of other vinyl ester monomers include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate and aromatic vinyl esters such as vinyl benzoate. Use can be made of aliphatic vinyl esters each having usually 3-20 carbon atoms, preferably 4-10 carbon atoms, especially preferably 4-7 carbon atoms. Although any one of such vinyl esters are usually used alone, two or more thereof may be simultaneously used according to need.

The content of structural ethylene units in the EVOH resin is usually 20-60% by mole, preferably 25-50% by mole, especially preferably 25-35% by mole, in terms of the value determined in accordance with ISO 14663 (1999). In case where the content thereof is too low, high-humidity gas barrier property and meltability/moldability tend to be reduced. Conversely, in case where the content thereof is too high, the gas barrier properties tend to be insufficient.

The degree of saponification of the vinyl ester component in the EVOH resin is usually 90-100% by mole, preferably 95-100% by mole, especially preferably 99-100% by mole, in terms of the value determined in accordance with JIS K6726 (1994) (the EVOH resin being in the state of an even solution in water/methanol solvent). In case where the degree of saponification thereof is too low, gas barrier property, thermal stability, moisture resistance, or the like tend to be reduced.

The melt flow rate (MFR) (210° C.; load, 2,160 g) of the EVOH resin is usually 0.5-100 g/10 min, preferably 1-50 g/10 min, especially preferably 3-35 g/10 min. In case where the MFR thereof is too high, this resin tends to have unstable film forming properties. In case where the MFR thereof is too low, this resin has too high a viscosity and melt extrusion tends to be difficult.

The EVOH resins to be used in the invention may further contain structural units derived from the comonomers shown below, besides structural ethylene units and structural vinyl alcohol units (including unsaponified structural vinyl ester units). Examples of the comonomers include: α-olefins such as propylene, isobutene, α-octene, α-dodecene, and α-octadecene; hydroxyl-containing α-olefins such as 3-buten-1-ol, 4-penten-1-ol, and 3-butene-1,2-diol and derivatives of such hydroxyl-containing α-olefins, e.g., products of esterification or acylation; unsaturated carboxylic acids or salts, partial alkyl esters, complete alkyl esters, nitriles, amides, or anhydrides thereof; unsaturated sulfonic acids or salts thereof; vinylsilane compounds; vinyl chloride; and styrene.

Furthermore, use can be made of EVOH resins which have undergone "after modification" such as urethane formation, acetalization, cyanoethylation, or oxyalkylation.

Preferred of such modification products are EVOH resins in which primary hydroxyl groups have been introduced into side chains by copolymerization, from the standpoint that these EVOH resins show satisfactory suitability for secondary moldability such as stretching and vacuum/air-pressure forming. Preferred of these are EVOH resins having a 1,2-diol structure in side chains.

The EVOH resins to be used in the invention may contain ingredients which are generally incorporated into EVOH resins, so long as the incorporation thereof does not lessen the effect of the invention. Examples of such ingredients include heat stabilizers, antioxidants, antistatic agents, colorants, ultraviolet absorbers, lubricants, plasticizers, light stabilizers, surfactants, antibacterials, desiccants, antiblocking agents, flame retardants, crosslinking agents, hardeners, blowing agents, nucleating agents, antifogging agents, additives for biodegradation, silane coupling agents, and oxygen absorbents.

As the heat stabilizers, additives such as the following may be added beforehand in a small amount for the purpose of improving various properties including thermal stability during melting and molding. The additives include: organic acids such as acetic acid, propionic acid, butyric acid, lauric acid, stearic acid, oleic acid, and behenic acid, or salts thereof such as alkali metal salts (sodium, potassium, etc.), alkaline earth metal salts (calcium, magnesium, etc.), and the zinc salts; or inorganic acids such as sulfuric acid, sulfurous acid, carbonic acid, phosphoric acid, and boric acid or salts thereof such as alkali metal salts (sodium, potassium, etc.), alkaline earth metal salts (calcium, magnesium, etc.), and the zinc salts.

An EVOH resin to be used in the invention may be a mixture thereof with an EVOH resin different therefrom. Examples of the other EVOH resin include one differing in ethylene content, one differing in saponification degree, one differing in polymerization degree, one differing in other comonomer components, and one differing in the content of structural 1,2-diol units.

In particular, according to the present invention, a laminate which includes a layer including an EVOH resin and which retains gas barrier properties and is inhibited from developing streaks even when vacuum/air-pressure forming is applied thereto can be attained in cases when the laminate is a laminate comprising a layer comprising two or more EVOH resin differing in ethylene content and a layer which comprises a thermoplastic resin that is not a EVOH resin and which has been laminated to at least one surface of the layer comprising EVOH resins via a layer comprising an adhesive resin. The case where two EVOH resins, for example, are used is explained below.

Two EVOH resins usable in the invention are a combination of EVOH resins selected from among the EVOH resins shown above. Preferred is a combination of EVOH resins in which the difference in the ethylene content of the structural ethylene units (ΔEt) between the EVOH resin which is the highest in the ethylene content and the EVOH resin which is the lowest in the ethylene content is 10-25% by mole. The difference in ethylene content (ΔEt) is more preferably 10-23% by mole, especially preferably 10-20% by mole. In case where the difference in ethylene content between the EVOH resin which is the highest in the ethylene content and the EVOH resin which is the lowest in the ethylene content is too small, it tends to be difficult to retain a balance between moldability and gas barrier properties. In case where the difference is too large, the two EVOH resins have reduced compatibility with each other and streaks tend to generate during secondary molding because of a difference in stretchability. There are cases where the generation of a large amount of streaks makes it impossible to obtain transparent molded articles.

Specifically, it is preferred to use a combination of an EVOH resin having a lower ethylene content (low-ethylene EVOH resin) and an EVOH resin having a higher ethylene content (high-ethylene EVOH resin) such as that shown below.

The low-ethylene EVOH resin has an ethylene content of 20-40% by mole, preferably 22-38% by mole, especially preferably 25-33% by mole. In case where the ethylene content thereof is too low, there is a tendency that the decomposition temperature and the melting point are too close to each other, making it difficult to melt and mold the resin composition. Conversely, in case where the ethylene content thereof is too high, there is a tendency that the importation of gas barrier properties by the low-ethylene EVOH resin is insufficient.

The degree of saponification of the vinyl ester component in the low-ethylene EVOH resin is usually 90% by mole or higher, preferably 95-99.99% by mole, especially preferably 98-99.99% by mole. In case where the degree of saponification thereof is too low, the effect of imparting gas barrier properties by the low-ethylene EVOH resin tends to be insufficient.

Furthermore, the melt flow rate (MFR)(210° C.; load, 2,160 g) of the low-ethylene EVOH resin is usually 1-100 g/10 min, preferably 3-50 g/10 min, especially preferably 3-10 g/10 min. In case where the MFR thereof is too high, the molded object tends to have reduced mechanical strength. In case where the MFR thereof is too low, the resin composition tends to have reduced extrudability.

Meanwhile, the ethylene content of the high-ethylene EVOH resin is usually 40-60% by mole, preferably 42-56% by mole, especially preferably 44-53% by mole. In case where the ethylene content thereof is too low, there is a tendency that the stretchability-improving effect of the high-ethylene EVOH resin is too low, resulting in a decrease in secondary moldability. Conversely, in case where the ethylene content thereof is too high, the ethylene content of the low-ethylene EVOH resin must be heightened in order to obtain an ethylene content difference in the given range, resulting in a resin composition layer having insufficient gas barrier properties.

The degree of saponification of the vinyl ester component in the high-ethylene EVOH resin is usually 90% by mole or higher, preferably 93-99.99% by mole, especially preferably 98-99.99% by mole. In case where the degree of saponification thereof is too low, the gas barrier properties of the high-ethylene EVOH resin tend to be insufficient.

Furthermore, the melt flow rate (MFR) (210° C.; load, 2,160 g) of the high-ethylene EVOH resin is usually 1-100 g/10 min, preferably 3-50 g/10 min, especially preferably 3-30 g/10 min. In case where the MFR thereof is too high, the molded object tends to have reduced mechanical strength. In case where the MFR thereof is too low, the resin composition tends to have reduced extrudability.

The blending ratio between the low-ethylene EVOH resin (A1) to the high-ethylene EVOH resin (A2), A1/A2 (weight ratio), is usually from 90/10 to 60/40, preferably from 85/15 to 65/35, especially preferably from 80/20 to 70/30. In case where the proportion of the low-ethylene EVOH resin (A1) is too low, the composition layer tends to have insufficient gas barrier properties. In case where the proportion thereof is too high, the stretchability-improving effect of the high-ethylene EVOH resin tends to decrease.

<Adhesive Resin>

The adhesive resin to be used in the invention is explained.

As the adhesive resin, a known adhesive resin may be used. The adhesive resin varies depending on the kinds of the base resins, and may hence be suitably selected. Representative examples thereof include carboxyl-containing modified olefin-based polymers each obtained by chemically bonding an unsaturated carboxylic acid or the anhydride thereof to a polyolefin resin by addition reaction, graft reaction, etc. Of these, maleic-anhydride-modified polyolefins are preferred as the adhesive resin. A combination thereof with a polyolefin, in particular, polypropylene, as a base resin is preferred.

The maleic-anhydride-modified polyolefins are, for example, polyethylene modified by grafting with maleic anhydride, polypropylene modified by grafting with maleic anhydride, ethylene/propylene (block and random) copolymers modified by grafting with maleic anhydride, ethylene/ethyl acrylate copolymers modified by grafting with maleic anhydride, ethylene/vinyl acetate copolymers modified by grafting with maleic anhydride, and the like. Preferred is either one polymer selected from these or a mixture of two or more thereof.

These adhesive resins can be blended with: an EVOH resin composition for forming the EVOH-resin-containing layer according to the invention; an EVOH resin other than the EVOH resins used in the resin composition; a rubber/elastomer ingredient such as polyisobutylene or an ethylene/propylene rubber; any of the other thermoplastic resins described later; or the like. In particular, blending with a polyolefin resin different from the polyolefin resin as the base of the adhesive resin is useful because there are cases where this blending brings about an improvement in adhesiveness.

<Other Thermoplastic Resin>

The other thermoplastic resin to be used in the invention is explained. In the present invention, the other thermoplastic resin is a thermoplastic resin which is not an EVOH resin.

Examples of the other thermoplastic resin (referred to as "base resin") to be used here include: polyolefins such as polyethylenes, e.g., linear low-density polyethylene, low-density polyethylene, ultralow-density polyethylene, medium-density polyethylene, and high-density polyethylene, polypropylene, ethylene/propylene (block and random) copolymers, propylene/α-olefin (α-olefin having 4-20 carbon atoms) copolymers, polybutene, and polypentene; graft-modified polyolefins obtained by modifying these polyolefins by grafting with an unsaturated carboxylic acid or ester thereof; ethylene/vinyl compound copolymers such as ionomers, ethylene/vinyl acetate copolymers, ethylene/acrylic acid copolymers, and ethylene/acrylic ester copolymers; polyester resins; polyamide resins (including copolyamides); halogenated polyolefins such as poly(vinyl chloride), poly(vinylidene chloride), chlorinated polyethylene, and chlorinated polypropylene; vinyl ester resins; elastomers such as polyester elastomers and polyurethane elastomers; acrylic resins; polystyrene; and aromatic or aliphatic polyketones and polyalcohols obtained by reducing the polyketones. From the standpoint of the suitability for practical use of the laminate, such as the material properties (in particular, strength), polyolefin resins and polyamide resins are preferred, and it is especially preferred to use polyethylene or polypropylene.

These base resins may suitably contain conventionally known ingredients such as antioxidants, antistatic agents, lubricants, nucleating agents, antiblocking agents, ultraviolet absorbers, and waxes.

<Laminate>

In cases when the layer including a EVOH resins according to the invention, i.e., the EVOH resin composition layer formed from an EVOH resin composition, is expressed by "a" (a1, a2, . . . ), the adhesive resin layer is expressed by "b" (b1, b2, . . . ), and the base resin layer is expressed by "c" (c1, c2, . . . ), then any desired combinations are possible, such as a/b/c, c1/b/a/b/c2, c1/b1/a/b2/c2, and c1/b1/a1/b2/a2/b3/c2. Furthermore, in cases when a recycled layer which is obtained by subjecting edge parts, defectives, and the like resulting from production of the laminate to remelting and molding and which includes a mixture of the EVOH resin composition and the base resin is expressed by "R" (R1, R2, . . . ), then the layer configuration can be c/R/b/a, c1/R1/b1/a/b2/R2/c2, or the like.

The thicknesses of the base resin layer and adhesive resin layer of the laminate vary depending on the layer configuration, kind of the thermoplastic resin used as a base, kind of the adhesive resin, intended use or mode of packaging, required properties, etc., and cannot hence be unconditionally specified. However, the thickness of the base resin layer is selected from the range of usually about 0.1-5,000 µm, preferably about 1-1,000 µm, and that of the adhesive resin layer is selected from the range of usually about 0.1-500 µm, preferably about 1-250 µm.

Meanwhile, the thickness of the EVOH resin composition layer varies depending on the required gas barrier properties, etc. However, the thickness thereof is usually 0.1-500 µm, preferably 0.1-250 µm, especially preferably 0.1-100 µm. In case where the thickness thereof is too small, sufficient gas barrier properties tend to be not obtained. Conversely, in case where the thickness thereof is too large, the film tends to have insufficient flexibility.

The thickness ratio between the EVOH resin composition layer(s) and the base resin layer(s) in the laminate (resin composition layer/base resin layer) is such that in the case where the former and the latter are each a plurality of layers, the ratio between the thickest layers is usually from 1/99 to 50/50, preferably from 5/95 to 45/55, especially preferably from 10/90 to 40/60. Meanwhile, the thickness ratio between the resin composition layer(s) and the adhesive resin layer(s) in the laminate (resin composition layer/adhesive resin layer) is such that in the case where the former and the latter are each a plurality of layers, the ratio between the thickest layers is usually from 10/90 to 99/1, preferably from 20/80 to 95/5, especially preferably from 30/70 to 90/10.

The EVOH resin composition layer, adhesive resin layer, and base resin layer can be laminated together by a known method. For example, the EVOH resin and the adhesive resin can be laminated to each other by coextrusion molding which involves confluence within the device. Specific examples thereof include: a method in which a feed block is used to cause the layers to join together and the superposed layers are expanded to the width of a molded article within the die; a method in which a multi-manifold die is used and the layers are expanded to the width of a product and then caused to join together, and a method in which the EVOH resin and the adhesive resin are superposed by either of those techniques and then spread on a base constituted of another resin layer. Preferred from the standpoints of cost and environment is a method in which all of the EVOH resin composition layer, adhesive resin layer, and base resin layer are molded by coextrusion molding.

A great feature of the present invention resides in that when performing the coextrusion molding, the shear viscosity ratio at a shear rate of 0.1 [1/s] between the EVOH resin and the adhesive resin (EVOH resin/adhesive resin) is 0.70-1.50 and the shear viscosity ratio at a shear rate of 1.0 [1/s] therebetween (EVOH resin/adhesive resin) is 0.90-1.10.

<Shear Viscosity>

In the present invention, the shear viscosity ratio at a shear rate of 0.1 [1/s] between the EVOH resin and the adhesive resin (EVOH resin/adhesive resin) is 0.70-1.50, preferably 0.80-1.45, especially preferably 0.90-1.40. The shear viscosity ratio at a shear rate of 1.0 [1/s] between the EVOH resin and the adhesive resin (EVOH resin/adhesive resin) is 0.90-1.10, preferably 0.95-1.05, especially preferably 0.99-1.01.

In case where the shear viscosity ratios therebetween are too high, this laminate, when subjected to vacuum/air-pressure forming, tends to develop streaks or the like, resulting in an appearance failure.

Values of shear viscosity in the invention are ones measured with a rotary rheometer under the following conditions.

(Measuring Conditions)

Atmosphere, nitrogen atmosphere; temperature, 210[° C.]; strain, 5[%]; measuring jig, parallel-parallel plates with a diameter of 25 mm; preheating time, 10 [min].

In the specific shear region, method for setting shear viscosity differences within the given ranges is not particularly limited. However, the desired shear viscosity differences can be obtained by using the following and other methods in a suitable combination.

(1) With Respect to Methods for Regulating Shear Viscosity of EVOH Resin

The shear viscosity can be regulated, for example, by changing at least one of the molecular weight, ethylene content, saponification degree, and MFR of an EVOH resin or by using a plurality of EVOH resins in combination. However, these methods are difficult to use because other properties including moldability and gas barrier properties are also changed considerably.

Preferred is a method in which an additive that is highly effective in changing shear viscosity is used in a slight amount so that the other properties are not affected.

Examples of the additive include (i) polyamide resins, which are resins reactive with the EVOH resin, (ii) polyolefins, polyesters, polystyrene, polycarbonates, and copolymers thereof, which are resins not reactive with the EVOH resin, (iii) inorganic substances such as fillers and glass fibers, and (iv) metal salts of higher fatty acids, such as the zinc salts of higher fatty acids.

(2) With Respect to Methods for Regulating Shear Viscosity of Adhesive Resin

Examples include a method in which adhesive resins differing in molecular weight or resins differing in composition are blended and a method in which the degree of acid modification is changed. However, from the standpoint of maintaining the peel strength of the molded article on a practicable level, it is desirable to attain the desired shear viscosity differences by regulating the EVOH resin in accordance with the adhesive resin to be used.

Especially suitable of these is the method for regulating the shear viscosity of an EVOH resin wherein a metal salt of a higher fatty acid, in particular, the zinc salt of a higher fatty acid, is added as an additive to the EVOH resin. Thus, the desired regulation for making the shear viscosities in the specific shear region have differences within the given ranges is advantageously rendered possible.

The higher fatty acid salt to be used as a higher-fatty-acid zinc salt is a fatty acid having 8 or more carbon atoms (preferably 12-30 carbon atoms, more preferably 12-20 carbon atoms). Examples thereof include lauric acid, tridecylic acid, myristic acid, pentadecylic acid, palmitic acid, heptadecylic acid, stearic acid, nonadecanoic acid, oleic acid, capric acid, behenic acid, and linoleic acid. Suitable of these are stearic acid, oleic acid, and lauric acid.

The zinc salts of such higher fatty acids can improve the suitability for secondary moldability of EVOH resins, in particular, a resin composition including, in combination, two EVOH resins wherein the difference in ethylene content (ΔEt) between the resin which is the highest in the content and the resin which is the lowest in the content is 10-25% by mole. In particular, even when the laminate is subjected to processing in which the applied tension varies from portion to portion as in vacuum/air-pressure forming and in which tension is applied from all directions as in diameter-enlarging processing, it is possible to obtain molded articles in which the generation of streaks has been inhibited.

Although the reason for that effect is unclear, it seems that the zinc salts of higher fatty acids enhance the molten-state miscibility of two EVOH resins differing in ethylene content and inhibit fine boundary disturbances from occurring when this resin composition is subjected to coextrusion molding together with other resins. This inhibitive effect is amazing and is not observed with other metal salts of the higher fatty acids or with the zinc salts of lower fatty acids.

The amount of the zinc salt of a higher fatty acid to be added is preferably 350-800 ppm, more preferably 400-750 ppm, especially preferably 450-700 ppm, of the EVOH resins. In case where the addition amount of the higher-fatty-acid zinc salt is too small, the effect of inhibiting the generation of streaks during secondary molding is lessened. If streaks generate in a large amount, the transparency of the molded articles is impaired. Meanwhile, since metal salts of higher fatty acids generally catalyze the decomposition of molten-state EVOH resins, too high concentrations of the zinc salt of a higher fatty acid result in a possibility that the EVOH resins might decompose and the resultant gas evolution might adversely affect the production of the laminate through melt molding or coextrusion molding.

Especially when zinc stearate is used as the higher-fatty-acid zinc, the amount of the zinc stearate to be added is 450-700 ppm of the EVOH resins.

[Other Additives]

Known additives such as a plasticizer, filler, antiblocking agent, antioxidant, colorant, antistatic agent, ultraviolet absorber, and lubricant besides the above components can be suitably incorporated into the EVOH resin composition layer to be used in the laminate of the invention, so long as the incorporation thereof is not counter to the spirit of the invention (e.g., the amount thereof is 1% by weight or less).

<Methods for Preparing EVOH Resin Composition>

Methods for preparing an EVOH resin composition by adding the zinc salt of a higher fatty acid to EVOH resins to be used in the laminate of the invention are not particularly limited. Use may be made of: a method in which EVOH resins and a higher-fatty-acid zinc salt are mixed together in a given proportion and this mixture is melt-kneaded or otherwise processed to prepare a resin composition; or a method in which the ingredients are merely dry-blended in a given proportion. The method of preparation by dry blending is advantageous from the standpoint of production, because a combination of EVOH resins can be suitably selected according to need and because the composition can be prepared by adding a higher-fatty-acid zinc salt according to need. The method of preparation by dry blending is preferred also from the standpoint of inhibiting the higher-fatty-acid zinc salt from decomposing molten-state EVOH resins. Namely, in a preferred method for preparing the resin composition according to the invention, a higher-fatty-acid zinc salt is brought into the state of being adherent to the surface of each EVOH resin be dry blending.

For dry-blending the ingredients, use may be made, for example, of: a method in which a low-ethylene EVOH resin and a high-ethylene EVOH resin are dry-blended and a higher-fatty-acid zinc salt is added to the blend; or a method in which a compound is produced beforehand by mixing two EVOH resins and a higher-fatty-acid zinc salt is added to the mixture compound. Two EVOH resins and a higher-fatty-acid zinc salt may be mixed together by dry blending.

Furthermore, use may be made of: a method in which either of the EVOH resins is dry-blended with a higher-fatty-acid zinc salt and the other EVOH resin is added to the blend; or a method in which a compound of either of the EVOH resins with a higher-fatty-acid zinc salt is produced beforehand and the other EVOH resin is added to the compound.

Moreover, use may be made of: a method in which a mixture obtained by dry-blending one of the EVOH resins with a higher-fatty-acid zinc salt is added to a mixture obtained by dry-blending the other EVOH resin with a higher-fatty-acid zinc salt; or a method in which a compound produced beforehand by mixing one of the EVOH resins with a higher-fatty-acid zinc salt is added to a compound produced beforehand by mixing the other EVOH resin with a higher-fatty-acid zinc salt <Applications of the Laminate>

The laminate, which has the configuration described above, is used usually after having undergone stretching with heating. Since the EVOH resin composition layer according to the invention has excellent gas barrier properties when used as a gas barrier layer and since it seems that the interlaminar boundaries have reduced boundary disturbances, various kinds of known stretching with heating can be applied thereto.

Specific examples thereof include: uniaxial or biaxial stretching in which both edges of a laminate sheet are pinched to widen the laminate sheet; drawing in which a laminate sheet is heated and softened and a bottomed container is formed therefrom using a press or the like; vacuum forming, air-pressure forming, or vacuum/air-pressure forming in which a laminate sheet is appressed to a die by vacuum suction, compressed-air blowing, or the like; and a method in which a preformed laminate such as a parison is processed by a tubular stretching method, stretch blowing method, etc. Since the laminate of the invention, which includes one or more EVOH resins, has been reduced in disturbances at the boundary between adjoining layers and has excellent stretchability with heating, the laminate is suitable not only for uniaxial stretching and for biaxial stretching in which the laminate is stretched in different directions successively but also for stretch or blow forming in which the laminate is simultaneously stretched in radial directions by appressing the laminate to a die.

The temperature at which the stretch forming with heating is conducted is selected from the range of usually about 40-300° C., preferably about 50-160° C., in terms of the temperature of the laminate (temperature of the vicinity of the laminate). The stretch ratio is usually 2-50, preferably 2-10, in terms of areal ratio.

With respect to heating of the laminate, it is preferred to evenly heat the laminate with a hot-air oven, a heater type oven, a combination of both, etc. A suitable means is selected in accordance with the kind of the method for stretch forming.

The laminate obtained by coextrusion molding or by further performing stretching with heating may be coated with another base by extrusion, or another base which is a film, sheet, or the like may be laminated thereto using an adhesive. As such bases, use can be made of not only the thermoplastic resins shown above as the base resin but also bases having poor stretchability (paper, metal foils, woven fabric, nonwoven fabric, metal cotton, wood, etc.). Furthermore, an inorganic-substance layer constituted of a metal or metal oxide may be formed on the laminate by vapor deposition or the like.

The thus-obtained molded articles such as bags constituted of a film, sheet, or stretched film and containers including cups, trays, tubes, bottles, and the like are useful as various packaging materials, packaging containers, and cover materials for not only general foods but also seasonings, e.g., mayonnaise and dressings, fermented foods, e.g., miso, oily or fatty foods, e.g., salad oil, beverages, cosmetics, medicines, etc.

[Production of Secondary Molded Article by Vacuum Forming or Air-Pressure Forming]

The laminate of the invention is suitable for producing secondary molded articles, in particular, bottomed containers such as cups and trays, by forming which is vacuum forming or air-pressure forming. Since the laminate of the invention is thought to have been reduced in fine resin flow disturbances at the interlaminar boundaries, secondary molded articles with excellent appearance can be obtained therefrom by forming.

Specifically, the process of the invention for producing a bottomed container excellent in terms of gas barrier property and appearance includes: a step of heating and softing a sheet or film of the laminate of the invention in the vicinity of a forming die; a step of appressing the sheet or film to the forming die by vacuum suction and/or with compressed air; and a step of obtaining a bottomed container by cooling and demolding.

The shape of the bottomed container is not particularly limited. The container may be a cylindrical bottomed container, a prismatic bottomed container, a bottomed container of an unusual shape, a conical bottomed container in which the diameter becomes gradually smaller or larger from the opening toward the bottom, a pyramidal bottomed container in which the area of the bottom is smaller than the area of the opening, a semispherical container, or a stepped bottomed container which narrows from the opening toward the bottom in two stages. The container may also be any of these containers which have a flange or protrudent part formed thereon.

Especially in the case where a shaped object having a draw ratio [(depth of the molded article (mm))/(maximum diameter of the molded article (mm))] of usually 0.1-3, such as a cup or a tray, is to be produced, vacuum/air-pressure forming is employed in which abrupt stretching is involved.

In the vacuum/air-pressure forming, however, there is a difference in the magnitude of the tension applied to the resin between the sidewall part and bottom part of the cup, and it is hence difficult to produce a molded article having an excellent appearance. However, molded articles having an excellent appearance and having the intact gas barrier properties can be obtained from the laminate employing the resin composition according to the invention, even when the laminate is formed into the shape of a cup by vacuum/air-pressure forming in which the tension applied during the forming varies from portion to portion.

The heating temperature in the step of heating and softening is selected from the range of usually about 40-300° C., preferably about 50-170° C., especially preferably about 60-160° C., in terms of the temperature of the laminate (temperature of the vicinity of the laminate). In case where the heating temperature is too low, there is a tendency that the softening is insufficient and a molded article having an excellent appearance is not obtained. Too high heating temperatures may result in a possibility that the balance among the melt viscosities of the respective layers might be lost, making it impossible to obtain molded articles having an excellent appearance.

The heating time, which is a time period in which the laminate can be heated to such a degree that a softened state necessary and sufficient for the forming can be attained, is suitably set in accordance with the layer configuration of the laminate, composition of each of the layers constituting the laminate, temperature of the heater used for the heating, etc.

It is preferable that the draw ratio in the vacuum/air-pressure forming [(depth of the molded article (mm))/(maximum diameter of the molded article (mm))] is usually 0.1-3, preferably 0.2-2.5, especially preferably 0.3-2, although the draw ratio depends on the shape of the bottomed container to be obtained. In case where the value thereof is too large, the EVOH resin composition layer is prone to develop cracks or the like. In case where the value thereof is too small, the wall is prone to have thickness unevenness.

The thicknesses of the thermoplastic resin layer and adhesive resin layer of the laminate which has secondary molded described above vary depending on the layer configuration, kind of the thermoplastic resin, kind of the adhesive resin, intended use or mode of packaging, required properties, etc., and cannot hence be unconditionally specified. However, the thickness of the thermoplastic resin layer is selected from the range of usually about 0.1-3,000 µm, preferably about 1-500 µm, and that of the adhesive resin layer is selected from the range of usually about 0.1-300 µm, preferably about 1-100 µm.

Meanwhile, the thickness of the EVOH resin composition layer according to the invention, after the stretching, varies depending on the required gas barrier properties, etc. However, the thickness thereof is usually 0.1-300 µm, preferably 0.1-100 µm, especially preferably 0.1-50 µm. In case where the thickness thereof is too small, sufficient gas barrier properties tend to be not obtained. Conversely, in case where the thickness thereof is too large, the film tends to have insufficient flexibility.

Furthermore, the thickness ratio between the EVOH resin composition layer and the adhesive resin layer and the ratio between the total thickness of the EVOH resin composition layers and the total thickness of the thermoplastic resin layers do not change considerably through the stretching with heating, and are values similar to those for the laminate shown above.

The bottomed container produced by the process of the invention retains the excellent gas barrier properties inherent in the EVOH resin composition layer and has excellent transparency and no wall thickness unevenness. Furthermore, the container as a secondary molded article has been inhibited from having streaks which are visually noticeable. The reason for this is thought to be that the EVOH resin composition layer of the laminate used as the raw material had been inhibited from having boundary disturbances at the boundary of the resin composition layer and the adjoining layer in the laminate and had been reduced in the amount of fine boundary disturbances causative of streaks. Consequently, the bottomed container further has an excellent appearance and is hence useful as various packaging containers for not only general foods but also seasonings, e.g., mayonnaise and dressings, fermented foods, e.g., miso, oily or fatty foods, e.g., salad oil, beverages, cosmetics, medicines, etc.

EXAMPLES

The present invention is explained below in detail by reference to Examples. However, the invention should not be construed as being limited to the following Examples unless the invention departs from the spirit thereof.

In the following Examples and Comparative Examples, the term "parts" means parts by weight unless otherwise indicated.

The EVOH resins and higher-fatty-acid metal salt which were used in the following Examples and Comparative Examples are as follows.

EVOH resin 1: content of structural ethylene units, 29% by mole; degree of saponification, 99.6% by mole; MFR, 4.0 g/10 min (210° C.; load, 2,160 g)

EVOH resin 2: content of structural ethylene units, 44% by mole; degree of saponification, 98.5% by mole; MFR, 4.0 g/10 min (210° C.; load, 2,160 g)

Higher-fatty-acid metal salt: zinc stearate

Example 1

[Production of EVOH Resin Composition]

The two EVOH resins shown above were used and mixed together so that the amount of EVOH resin 1, which was the lower in ethylene content, was 75 parts and that of EVOH resin 2, which was the higher in ethylene content, was 25 parts. Furthermore, the higher-fatty-acid zinc salt was added thereto in an amount of 500 ppm per 100 parts by weight of the sum of EVOH 1 and EVOH 2, and the ingredients were dry-blended to thereby prepare an EVOH resin composition.

Example 2

The two EVOH resins shown above were used and mixed together so that the amounts of EVOH resin 1 and EVOH resin 2 were 25 parts and 75 parts, respectively. The ingredients were dry-blended to thereby prepare an EVOH resin composition.

Comparative Example 1

The two EVOH resins shown above were used and mixed together so that the amounts of EVOH resin 1 and EVOH resin 2 were 75 parts and 25 parts, respectively. The ingredients were dry-blended to thereby prepare an EVOH resin composition.

Comparative Example 2

The two EVOH resins shown above were used and mixed together so that the amounts of EVOH resin 1 and EVOH resin 2 were 50 parts and 50 parts, respectively. The ingredients were dry-blended to thereby prepare an EVOH resin composition.

[Production of Laminates]

Each EVOH resin composition prepared above, polypropylene ("EG47FT", manufactured by Japan Polypropylene Corp.), and an adhesive resin ("Admer QF551", manufactured by Mitsui Chemicals, Inc.) were fed to a coextrusion T-die sheet extruder of the three-resin five-layer type, and a laminate (film) of a three-resin five-layer structure composed of polypropylene layer/adhesive resin layer/EVOH resin composition layer/adhesive resin layer/polypropylene layer was obtained by coextrusion molding. The thicknesses (μm) of the respective layers of the laminate were 450/25/50/25/450.

All of the die temperatures of a forming machine were set at 210° C.

[Measurement of Shear Viscosities]

The shear viscosities (Pa·s) of each EVOH resin composition prepared above and the adhesive resin were measured with a rotary rheometer ("MCR301", manufactured by Anton Paar GmbH) under the following conditions.

(Measuring Conditions)

Atmosphere, nitrogen atmosphere; temperature, 210 [° C.]; strain, 5[%]; measuring jig, parallel-parallel plates with a diameter of 25 mm; preheating time, 10 [min].

Furthermore, from the shear viscosities (Pa·s) obtained, the shear viscosity ratios (EVOH resin/adhesive resin) at shear rates of 0.1 [1 s] and 1.0 [1/s] were calculated. The results thereof are shown in Table 1.

[Secondary Molding of the Laminates]

The die temperature and heater temperature of a vacuum/air-pressure forming machine (plug-assisted type vacuum/air-pressure forming machine manufactured by Asano Laboratories Co., Ltd.) were set at 50° C. and 500° C., respectively. By using each three-resin five-layer laminated film obtained above (length×width=40 mm×40 mm; thickness, 1,000 μm; thickness of the EVOH resin composition layer 50 μm), conical bottomed containers in which the bottom had a larger area than the opening (top diameter, 48 mm; bottom diameter, 80 mm; depth, 52 mm; draw ratio [(depth of molded article (mm))/(maximum diameter of molded article (mm))], 0.65) were produced.

The heating time (heater temperature, 500° C.) for heating and softening each laminated film was set at 22 seconds, 24 seconds, or 26 seconds, and molded articles were obtained with respect to each case. The suitability for secondary molding was evaluated on the basis of the following criteria.

[Evaluation of Suitability for Secondary Molding]

The appearance of each molded article (cup) obtained was visually examined to evaluate the degree of streak generation.

A: No streaks, or streaks (thickness, less than 200 μm) are slightly observed.

B: There partly are streaks having a thickness of 200 μm or larger but less than 300 μm.

C: There partly are streaks having a thickness of 300-500 μm.

D: Streaks having a thickness of 300-500 μm have generated throughout the whole molded article.

TABLE 1

| | | Example 1 | Example 2 | Comparative Example 1 | Comparative Example 2 |
|---|---|---|---|---|---|
| Composition (parts) | EVOH1 | 75 | 25 | 75 | 50 |
| | EVOH2 | 25 | 75 | 25 | 50 |
| | ΔEt | 15 | 15 | 15 | 15 |
| | Higher-fatty-acid zinc salt | St-Zn 500 ppm | — | — | — |
| | Shear viscosity ratio at shear rate 0.1 [1/s] (EVOH resin/adhesive resin) | 1.43 | 1.16 | 1.64 | 1.37 |
| | Shear viscosity ratio at shear rate 1 [1/s] (EVOH resin/adhesive resin) | 1.01 | 0.92 | 1.12 | 1.14 |
| Appearance of container | 22 sec | A | B | C | D |
| | 24 sec | A | B | D | D |
| | 26 sec | B | B | D | D |

EVOH1: ethylene content, 29 mol %; degree of saponification, 99.6 mol %; MFR, 4.0 g/10 min
EVOH2: ethylene content, 44 mol %; degree of saponification, 98.5 mol %; MFR, 4.0 g/10 min
ΔEt: difference in ethylene content (mol %)
St-Zn: zinc stearate The above results show that in the case where the laminates which had been produced so that the shear viscosity ratios between the EVOH and the adhesive resin (EVOH resin/adhesive resin) were within given ranges at shear rates of 0.1 [1/s] and 1.0 [1/s] were used, the bottomed containers obtained have been inhibited from having streaks or have completely no streaks. It can be seen that the effect of inhibiting streak generation in vacuum/air-pressure forming was exhibited.

While the invention has been described in detail and with reference to specific embodiments thereof, it will be apparent to one skilled in the art that various changes and modifications can be made therein without departing from the spirit and scope thereof. This application is based on a Japanese patent application filed on Nov. 18, 2014 (Application No. 2014-233819), the contents thereof being incorporated herein by reference.

INDUSTRIAL APPLICABILITY

The laminate of the invention is useful as a raw material for producing bottomed containers excellent in terms of gas barrier property and appearance.

The invention claimed is:

1. A laminate comprising
a layer comprising a saponified ethylene/vinyl ester copolymer and
a layer which comprises a thermoplastic resin that is not a saponified ethylene/vinyl ester copolymer or a polyester resin and which has been laminated to at least one surface of the layer comprising a saponified ethylene/vinyl ester copolymer via a layer comprising an adhesive resin,
wherein shear viscosity ratio of the saponified ethylene/vinyl ester copolymer and the adhesive resin (saponified ethylene/vinyl ester copolymer to adhesive resin) is 0.70-1.50 at a shear rate of 0.1 [1/s] and 0.90-1.10 at a shear rate of 1.0 [1/s];
wherein the saponified ethylene/vinyl ester copolymer comprises:
a first EVOH resin (A1) having an ethylene content of 20-40% by mole, and
a second EVOH resin (A2) having an ethylene content of 40-60% by mole,
wherein the blending ratio between the first EVOH resin (A1) to the second EVOH resin (A2), A1/A2 (weight ratio), is 75/25 to 70/30; and
wherein the layer comprising a saponified ethylene/vinyl ester copolymer contains a zinc salt of a fatty acid having 8 or more carbon atoms in an amount by mass of 350-800 ppm in terms of the saponified ethylene/vinyl ester copolymer.

2. The laminate according to claim 1, wherein the saponified ethylene/vinyl ester copolymer is a mixture of two or more saponified ethylene/vinyl ester copolymers which differ in the content of structural ethylene units.

3. The laminate according to claim 2, wherein the difference in the ethylene content of the structural ethylene units (ΔEt) between the saponified ethylene/vinyl ester copolymer which is the highest in the ethylene content and the saponified ethylene/vinyl ester copolymer which is the lowest in the ethylene content, of the two or more saponified ethylene/vinyl ester copolymers, is 10-25% by mole.

4. The laminate according to claim 1, wherein the thermoplastic resin is polypropylene.

5. A process for obtaining a bottomed container, the process comprising:
heating and softening a sheet or film of the laminate according to claim 1;
appressing the sheet or film to a forming die by at least one of vacuum suction and compressed air; and
obtaining a bottomed container by cooling and demolding the appressed sheet or film.

* * * * *